No. 659,890. Patented Oct. 16, 1900.
E. B. HOWITT.
EYEGLASS HOOK.
(Application filed June 18, 1900.)
(No Model.)
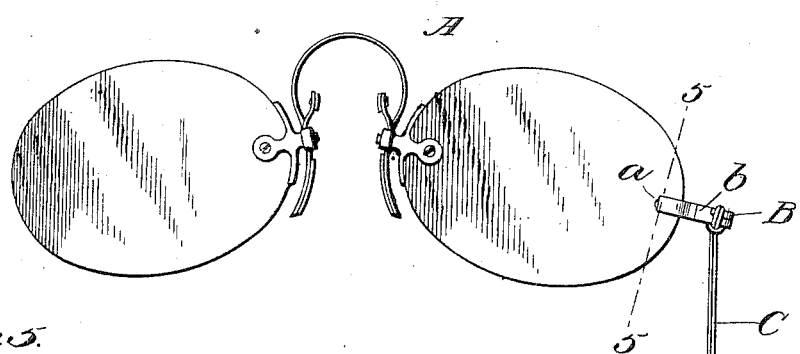
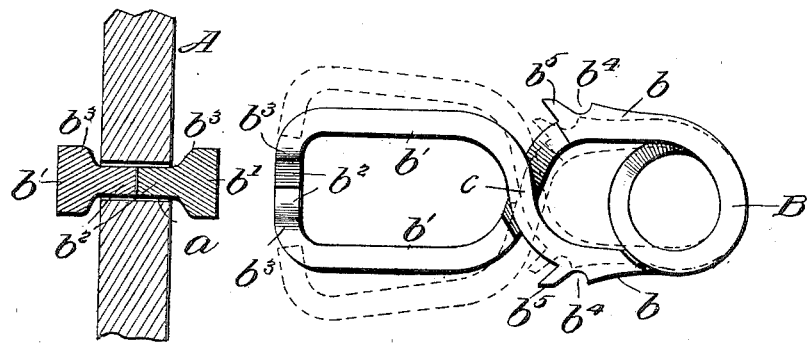
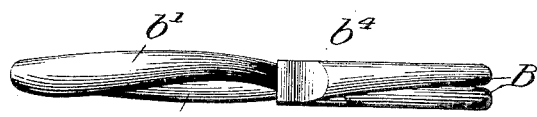
WITNESSES:
INVENTOR
Edwin B. Howitt
BY Whitaker Prevost
Attorneys.
THE NORRIS PETERS CO., PHOTO-LITHO., WASHINGTON, D. C.

UNITED STATES PATENT OFFICE.

EDWIN B. HOWITT, OF NEW BRUNSWICK, NEW JERSEY, ASSIGNOR OF ONE-HALF TO OTTO O. STILLMAN, OF SAME PLACE.

EYEGLASS-HOOK.

SPECIFICATION forming part of Letters Patent No. 659,890, dated October 16, 1900.

Application filed June 18, 1900. Serial No. 20,723. (No model.)

*To all whom it may concern:*

Be it known that I, EDWIN B. HOWITT, a citizen of the United States, residing at New Brunswick, in the county of Middlesex and State of New Jersey, have invented certain new and useful Improvements in Eyeglass-Hooks; and I do hereby declare the following to be a full, clear, and exact description of the invention, such as will enable others skilled in the art to which it appertains to make and use the same.

My invention is an improved eyeglass-hook for connecting the retaining cord or chain to one of the lenses of a pair of eyeglasses; and it consists in the novel features hereinafter described, reference being had to the accompanying drawings, which illustrate one form in which I have contemplated embodying my invention.

Referring to the accompanying drawings, Figure 1 represents a view of a pair of eyeglasses, showing one of my hooks applied to a lens thereof and connected to a retaining-cord. Fig. 2 is a side view of the hook greatly enlarged to show the peculiar construction of the same. Fig. 3 is an edge view of the same. Fig. 4 is a view similar to Fig. 3, showing the same form of hook formed of round wire. Fig. 5 is a sectional view on line 5 5 of Fig. 1.

The object of my invention is to provide a very small light hook which can be directly engaged with an aperture in one of the lenses of a pair of eyeglasses and which will require a very minute hole and yet be capable of being instantly inserted and removed without danger of breaking the lens when desired.

In Fig. 2 I have shown, on a greatly-enlarged scale, my improved hook, which is formed of one piece of metal, preferably gold, and comprises a central spring portion B, preferably, but not necessarily, in the form of a loop or coil from which two spring-arms $b\ b$ extend, said arms crossing each other at $c$ and having parallel portions $b'\ b'$, extending from the point where the arms cross to near the outer ends of the arms, said outer ends being provided with inwardly-bent gripping-lugs $b^2\ b^2$ of greatly-reduced diameter, as shown in Fig. 5. The gripping-lugs $b^2\ b^2$ extend in line with each other, and their outer ends normally meet accurately under the action of the spring portion B, and the distance between the shoulders $b^3\ b^3$ of the spring-arms, from which the lugs $b^2\ b^2$ extend, is substantially equal to the ordinary thickness of a lens. The distance between the parallel portions $b'\ b'$ of the spring-arms $b\ b$ is also substantially the same or slightly greater than the ordinary thickness of a lens. It will be observed that the hole in the lens need not be as large as the diameter of the spring-arms $b\ b$, but only sufficient to admit the reduced gripping-lugs $b^2\ b^2$, which enter the aperture in the lens from opposite sides and meet in the center, but do not pass each other, as clearly seen in Fig. 5. The entire hook is so minute in size that it would be impossible for it to be operated by the fingers, and I therefore provide each arm $b\ b$ in rear of the point of crossing with a deep notch $b^4$, extending transversely of the arm to be engaged by the nails of the thumb and finger of the operator. By providing the hook with these notches it can be made at least one-half the size that it would be necessary to make it if it had to be operated by the ends of the fingers in the usual manner. The forward wall of the finger-nail notch is formed by the arm or projection $b^5$. These arms or projections, instead of extending outward at right angles, extend forwardly at an acute angle, so that as the parts $b\ b$ are brought together by pressure these projections will come in contact with the rounded rear portions of $b'\ b'$ and prevent further movement. These projections, therefore, act as "stops," and I prefer to call them by that term. These stops serve to prevent the undue movement of the arms under pressure, and thus preserve the elasticity of the part serving as a spring. The stops $b^5\ b^5$ are so located that they arrest the motion of the parts at the time that the gripping-lugs are opened to admit or release the lens.

In Fig. 1, A represents a pair of eyeglasses having one of its lenses provided with an aperture $a$, which is engaged by the gripping-lugs $b^2\ b^2$ of one of my improved hooks. (See also Fig. 5.) A retaining cord or chain C is connected to the hook, preferably through the spring portion or coil, as shown in Fig. 1; but it may be secured to the hook in any other convenient way.

In the form of hook shown in Figs. 1, 2, 3, and 5 the hook is made of material rectangular in cross-section.

In Fig. 4 an edge view is shown of a hook constructed exactly like that shown in the other figures, except that it is made from round wire.

The hook may be opened by placing the nails of the thumb and forefinger in the notches $b^4$ $b^4$ and pressing, thus separating the arms and the gripping-points.

What I claim, and desire to secure by Letters Patent, is—

1. An eyeglass-hook comprising among its members, a pair of spring-arms united at one end and crossing each other between their ends, said arms having parallel portions adjacent to their outer ends, and reduced inwardly-extending and meeting gripping-lugs at their outer ends, each arm being provided with a finger-nail-engaging notch between the point where the arms cross and their united portions, substantially as described.

2. An eyeglass-hook comprising among its members, a pair of spring-arms united at one end and crossing each other between their ends and their outer ends provided with inwardly-extending gripping-lugs, each of said arms being provided with a finger-nail notch, one wall of said notch constituting a stop to limit the inward movement of said arms under pressure, substantially as described.

In testimony whereof I affix my signature in the presence of two witnesses.

EDWIN B. HOWITT.

Witnesses:
FREDERICK WEIGEL,
CHAS. A. SCHENCK.